Oct. 13, 1942.   O. W. HALING   2,298,371
PISTON RING
Filed April 1, 1939
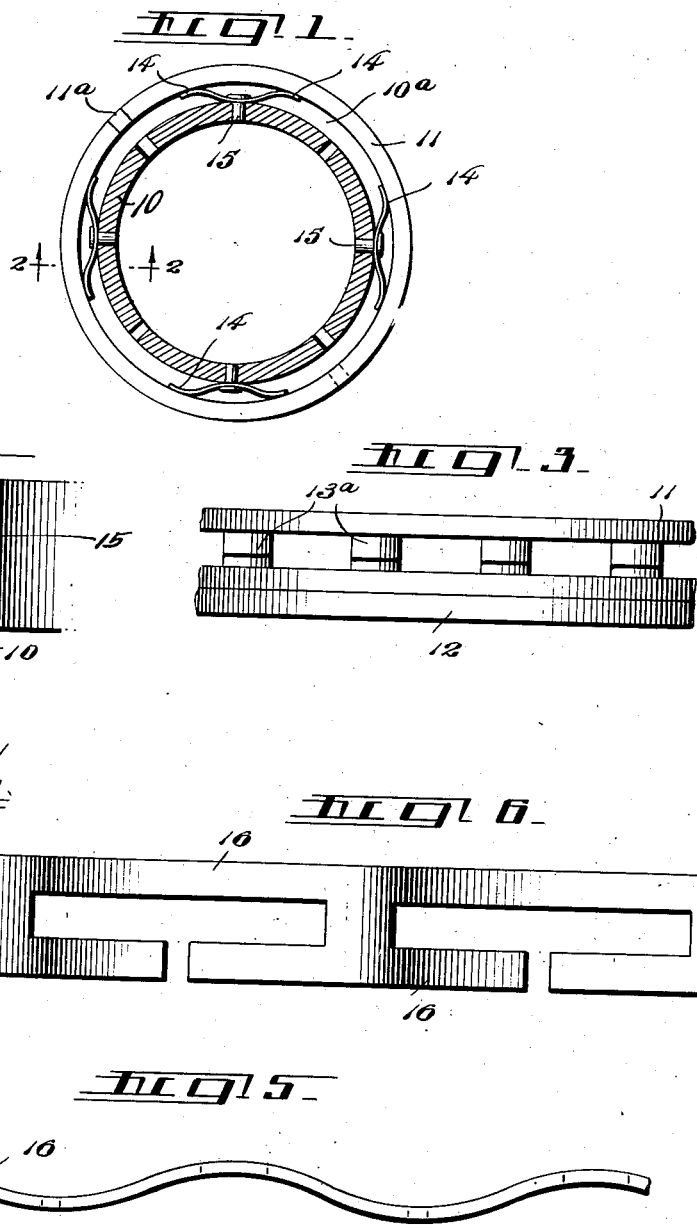
Inventor
OTTO W. HALING
By Chas. C. Reif
ATTORNEY Patented Oct. 13, 1942

2,298,371

UNITED STATES PATENT OFFICE 2,298,371

PISTON RING

Otto W. Haling, Rochester, Minn.

Application April 1, 1939, Serial No. 265,481

2 Claims. (Cl. 309—24)

This invention relates to piston rings and particularly to an improved assembly of piston ring parts.

It is desirable in a piston ring to have a ring or assembly which makes a tight seal for the piston and which accomplishes this with a minimum of expansive pressure. It is also desirable to have a structure of ring which will permit oil drainage and also prevent the passage of oil past the ring assembly.

It is an object of this invention therefore, to provide a piston ring structure or assembly comprising an upper and lower ring of small thickness and a third ring between said rings made of hardened spring steel and acting to hold said upper and lower rings against the walls of the ring groove.

It is more specifically an object of the invention to provide a piston ring assembly comprising upper and lower rings substantially rectangular in cross section and of small thickness together with a third ring disposed between said upper and lower rings and having a series of circumferentially spaced lugs bent to extend outwardly radially from its inner edge and spaced from the top surface of said third ring, said lugs being resilient and acting to hold said upper and lower rings against the walls of the ring groove.

These and other objects and advantages of the invention will be fully set forth in the following description made in connection with the accompanying drawings in which like reference characters refer to similar parts throughout the several views and in which:

Fig. 1 is a plan view of the assembled ring also showing the piston and ring expanding means, said piston being shown in horizontal section;

Fig. 2 is a vertical section taken on line 2—2 of Fig. 1 as indicated by the arrow;

Fig. 3 is a partial view in side elevation;

Fig. 4 is a view in radial section through a modified form of ring assembly;

Fig. 5 is a partial top plan view or edge view of an expander ring; and

Fig. 6 is a partial view in side elevation of said expander ring.

Referring to the drawing a piston 10 of the common automobile or combustion engine is shown, the same having formed therein a ring groove 10a. A ring assembly is shown in said groove comprising a top ring 11, a bottom ring 12 and a central ring 13. Said top ring 11 is shown in Fig. 1 and has the usual open space 11a between the ends thereof. As is customary, said ring is resilient so that it tends to press outward against the cylinder wall to further hold the ring assembly against the cylinder wall and to urge the same outward. Piston 10 is provided with a plurality of expander springs 14 shown as of the plate or leaf spring type, the same being secured at their central portions to piston 10 by the pins 15. Said springs 14 are formed on a double compound curve having convex portions adjacent their ends which engage the inner side of the ring assembly. Springs 14 are kept from shifting by the pins 15. The springs 14 can be variously provided to vary the unit pressure in back of the various rings or to the ring assembly. It will be noted that the upper and lower rings 11 and 12 are of rectangular form in radial cross section and are of comparatively small thickness. Said rings are shown as similar in form. The center ring 13 has a lower main portion substantially rectangular in cross section and is provided with a plurality of circumferentially spaced lugs 13a which extend radially outward and have their lower surfaces spaced from the top surface of the main portion of said ring. This middle ring 13 in practice has been made of annealed .070 to .090 carbon XHB spring steel .015 to .031 thick. It is notched, perforated and folded. It is then tempered to a hardness of 0.50 or that of the side segments, but can be varied. The lugs give resiliency to the ring and this structure is highly practical to compensate for variations in groove width as it makes the ring flexible for width. The lugs 13a thus act to hold the upper and lower rings 11 and 12 firmly against the upper and lower walls of the ring groove respectively. The faces of the lugs 13a may be made parallel to the surface of the main portion of the ring or at an angle as desired.

This spacer can also be of a 20 to 30 carbon steel #1 temper. The top face of the lugs can be made concave or convex or the end folded so that it contacts the attached section. The spacer or middle ring may be made concave, convex, cupped or flat depending on the shape of the upper and lower rings. It is desirable in some cases to have an inner ring such as shown at 16 as shown in Figs. 4 and 5, which would contact the upper and lower rings. In other cases all of the rings would be engaged by the springs 14 as shown in Figs. 1 and 2. The arrangement as shown in Figs. 1 and 2 gives increased bearing on the cylinder walls and results in a longer life for the ring.

In Figs. 4, 5 and 6 a ring assembly is shown comprising an upper ring 17 substantially rectangular in cross section but having a recess cut in its outer face providing an upper projecting lip 17a engaging the cylinder wall. Said ring will be preferably provided with a plurality of circumferentially extending spaced recesses extending from its lower surface, the same having an upper surface 17b. Ring 17 will preferably be of cast iron or similar soft metal. A lower ring 18 substantially rectangular in cross section and of comparatively small width, will be disposed in the lower portion of the ring groove. Ring 18 will preferably be made of tempered carbon steel. An expander ring 16 is disposed in the bottom of the groove and has the form shown in Figs. 5 and 6. Said ring will be of curved or wavy form as shown in Fig. 5 so that it will engage the bottom of the ring groove at spaced points and engage the ring assembly at spaced points. The ring assembly will thus be held firmly against the cylinder wall.

From the above description it will be seen that I have provided a very simple and yet highly efficient piston ring assembly. The assembly will be very durable and will also result in a very tight fit of the piston without undue friction on the cylinder wall. The ring assembly provides for oil drainage but also acts as an oil ring preventing the passage of oil past the piston. The ring assembly is very easily made and installed. Said piston ring assembly has been amply demonstrated in actual practice and found to be very successful and efficient.

It will of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

I claim:

1. A piston ring structure having in combination, upper and lower rings substantially rectangular in cross section of very small thickness and a third ring made of hard spring steel between said rings, all of said rings being constructed and arranged to be disposed within a piston ring groove rectangular in vertical cross section, said thin rings having flat surfaces engaging the top and bottom of said groove respectively, said third ring having a lower flat surface, said lower thin ring having a flat top surface engaged by said lower flat surface, said third ring having a series of circumferentially spaced lugs bent to extend outwardly radially from its inner edge and spaced from the top surface thereof to form a deep groove, said lugs being resilient transversely of said groove, said lugs having flat top surfaces, said top thin ring having a lower flat surface engaging said flat top surfaces of said lugs, said rings all being of the same width radially so as to be equally engaged by an expander in the bottom of said ring groove.

2. A piston ring structure having in combination, upper and lower rings of very small thickness and a third ring between said rings, all of said rings being constructed and arranged to be disposed within a piston ring groove rectangular in vertical cross section, said thin rings having flat surfaces engaging the top and bottom of said groove respectively, said third ring having a lower flat surface, said lower thin ring having a flat top surface engaged by said lower flat surface, said third ring being of soft tempered steel and having a series of circumferentially spaced lugs extending outwardly from its inner edge and spaced from the top thereof, said lugs terminating a short distance from the outer edge of said ring to form a deep groove with said ring, the same having flat top surfaces, said top thin ring having a lower flat surface engaging said flat top surfaces of said lugs, said rings being of the same width radially so as to be equally engaged by an expander in the bottom of said ring groove, said lugs being resilient and tending to hold the top and bottom rings against the top and bottom of said groove.

OTTO W. HALING.